Feb. 13, 1934.  C. H. SORENSEN  1,946,552
PACKING
Filed Nov. 3, 1930

INVENTOR
Carl H. Sorensen

BY
ATTORNEYS

Patented Feb. 13, 1934

1,946,552

UNITED STATES PATENT OFFICE 1,946,552

PACKING

Carl H. Sorensen, Detroit, Mich., assignor to Rhodes Metallic Packing Company, Detroit, Mich., a corporation of Michigan Application November 3, 1930. Serial No. 493,145

7 Claims. (Cl. 154—45.5)

My invention relates to improvement in metallic packing and more particularly to a flexible metallic packing composed of a plurality of complementary relatively movable sections.

An object of this invention is to provide a multi-section packing, each section of which is formed of a plurality of interfolded metallic strips compressed in interlocking position. With a packing structure of this character it is possible to coat the metallic strips with lubricant such as graphite, oil or the like whereby the packing is practically self-lubricating.

The invention contemplates forming each packing section of a substantially triangular or wedge shaped cross-section and assembling the sections with the apices of the triangles disposed substantially centrally of the packing whereby the inward movement of an opposed pair of wedge shaped sections such as caused by the tightening of the stuffing box gland will cause an outward movement of the other opposed pair of sections whereby the capacity of the packing for adjustment is increased.

Another object of this invention is to provide a multi-section packing having the characteristics heretofore referred to and in which the several sections are formed of interfolded and interlocked compressed strips of metal or metallic foil. A packing composition of this nature not only successfully resists heat and wear, but has a certain inherent resiliency which permits the packing to be compressed whereby it will expand when wear occurs.

Figure 2:
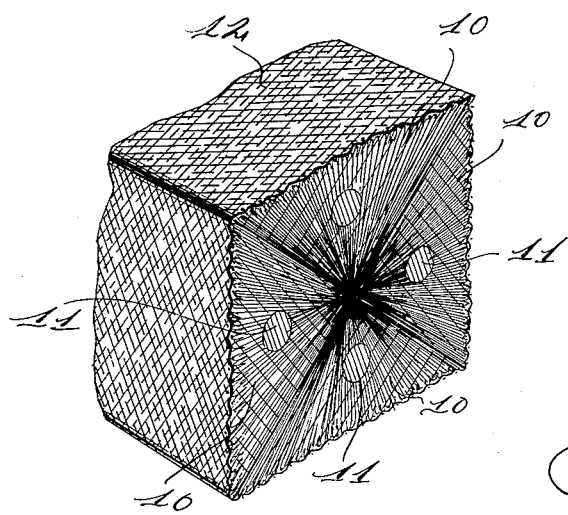
Figure 3:
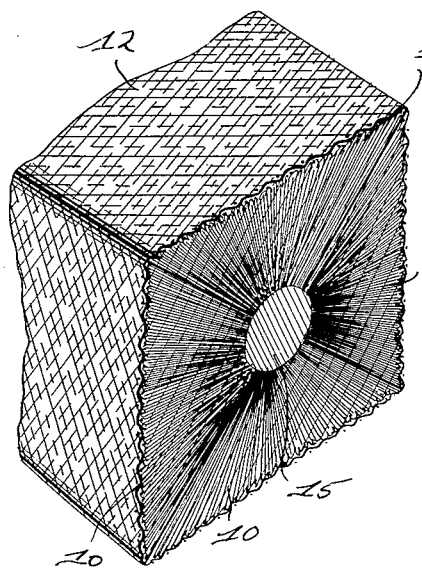
Figure 1:
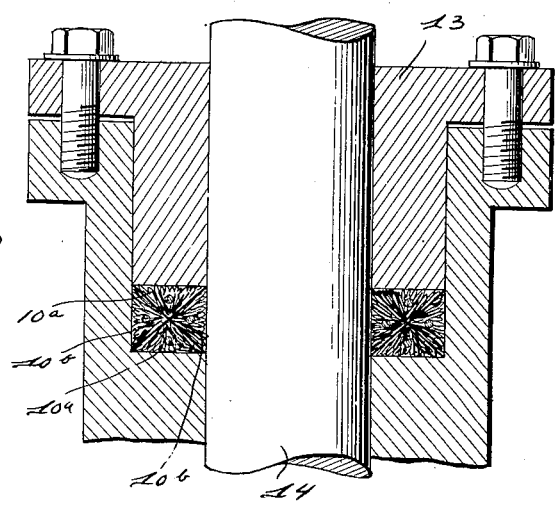

The several objects and advantages of the present form of packing will be made more apparent as this description proceeds, especially when considered in connection with the accompanying drawing, wherein Figure 1 is a sectional elevational view of a stuffing box with one form of my improved packing in place;

Figure 2 is an enlarged sectional perspective view of one form of my improved packing, and Figure 3 is a similar view of another modified form of packing.

As seen in Figure 2, the packing is preferably, although not necessarily, of substantially square cross-section and comprises a plurality, here shown as four, strips 10 each of which is substantially triangular or wedge shaped in cross-section. These four wedge shaped strips are assembled with the apices of the triangles arranged at a common juncture, that is, at substantially the longitudinal center of the packing. Thus the wedge shaped strips are arranged in opposed pairs and thus cooperate with one another to increase the capacity for the expansion of the packing. Each packing strip or section 10 is herein shown provided with a longitudinally extending core 11 which may be of any preferred or desired material but is preferably formed of a material or is so constructed to be relatively compressible. The reference character 12 indicates an outer protecting cover of any suitable flexible material.

Each section or strip of the packing is formed of a plurality of strips of metal or metallic foil interfolded to interlock the same and then compressed, the metal strips may be coated on one or both sides with any kind of lubricant such as graphite or oil or both and when interfolded and compressed, the strips retain the lubricant so that the packing is practically self-lubricating.

When a ring of packing constructed in accordance with my invention is placed in a stuffing box such as illustrated in Figure 1, the opposed pair of sections comprising the upper and lower sections 10a, will be moved inwardly toward one another when the gland 13 is tightened. The beveled or wedge shaped surfaces of the coacting sections of the packing will cause the other pair of sections 10b to be moved outwardly in opposed directions as will be apparent, thus expanding the packing against the rod or shaft 14. Thus, the capacity for adjustment of the packing with respect to other known types of packing is increased.

In Figure 3 a slightly modified form of construction is shown in which the core members 11 are omitted from each section 10 and a single centrally arranged core 15 is provided extending longitudinally of the packing at the juncture of the apices of the triangular sections. In every other respect the packing shown in Figure 3 is identical with that shown in Figure 2.

Obvious modifications will suggest themselves to those skilled in this art and to this end reservation is made to make such changes as may come within the purview of the accompanying claims.

What I claim as my invention is:

1. A composite flexible metallic packing comprising, two pair of opposed substantially triangular strips movable relative to each other and formed of metallic strips compressed in interlocked position, and an outer protecting cover.

2. A flexible metallic packing comprising, four strips of substantially triangular cross-section arranged with the apices of the triangles disposed centrally of the packing, each strip being formed of metallic strips compressed in interfolded and interlocked position, and an outer protecting cover of flexible material.

3. A composite flexible metalic packing comprising, two pair of opposed substantially triangular strips movable relative to each other and formed of metallic strips compressed in interfolded and interlocked position, a longitudinally extending core in said packing, and an outer protecting cover of relatively flexible material.

4. A flexible metallic packing comprising, four strips of substantially triangular cross-section arranged with the apices of the triangles disposed substantially centrally of the packing, each strip being formed of metallic strips interfolded and compressed in interlocked position about a relatively compressible core extending substantially centrally and longitudinally thereof, and an outer protecting cover of relatively flexible material.

5. A multi-section flexible metallic packing comprising, four strips of substantially wedge-shape cross-section, said strips being assembled with the apices of the wedges meeting substantially centrally of the packing whereby inward movement of an opposed pair of wedge-shaped strips causes an outward movement of the opposed pair, each of said strips being formed of a plurality of flexible metallic strips interfolded longitudinally and compressed in interlocked position, and an outer protecting covering enclosing said strips.

6. A multi-section flexible metallic packing comprising, four strips of substantially wedge-shape cross-section, said strips being assembled with the apices of the wedges meeting substantially centrally of the packing whereby inward movement of an opposed pair of wedge-shaped strips causes an outward movement of the opposed pair, a core of relatively compressible material extending longitudinally of each strip, and an outer protecting cover of relatively flexible material.

7. A flexible metallic packing comprising a longitudinally extending compressible core, and four strips of substantially triangular cross section arranged with the apices of the triangles disposed centrally of the packing and engaging the said core, each strip being formed of metallic strips compressed in interfolded and interlocked position.

CARL H. SORENSEN.